United States Patent [19]

Walker

[11] Patent Number: 4,712,237
[45] Date of Patent: Dec. 8, 1987

[54] METHOD AND APPARATUS FOR UNSCRAMBLING SYNC-SUPPRESSED TELEVISION SIGNALS

[75] Inventor: David L. Walker, Arlington Heights, Ill.

[73] Assignee: Zenith Electronics Corporation, Glenview, Ill.

[21] Appl. No.: 665,697

[22] Filed: Oct. 29, 1984

[51] Int. Cl.$^4$ .......................................... H04N 7/167
[52] U.S. Cl. ........................................ 380/15; 380/20
[58] Field of Search ................................. 358/120, 123

[56] References Cited

U.S. PATENT DOCUMENTS

| | | | |
|---|---|---|---|
| 4,307,416 | 12/1981 | Spano | 358/123 |
| 4,471,380 | 9/1984 | Mobley | 358/120 |
| 4,523,228 | 6/1985 | Banker | 358/120 |

OTHER PUBLICATIONS

Popular Electronics, May 1979, "The Upcoming New World of T.V. Reception", by Leslie Solomon.

Primary Examiner—Stephen C. Buczinski
Assistant Examiner—Aaron J. Lewis

[57] ABSTRACT

A TV signal decoder including a pair of flipflops, for receiving vertical sync signals identified by a single vertical blanking pulse in field No. 1 and a pair of pulses in field No. 2, includes a time delay circuit for operating the second flipflop only in response to the two pulse field. The outputs of the flipflop are coupled to a pair of AND gates and are supplied with decoding information that is serially translated under control of the appropriate field signal for decoding the television signal. A counter identifies the horizontal line number and is coupled to a PROM where the decoding information is stored for a specific scrambling system. The PROM may be replaced to enable operation with a different scrambling system.

6 Claims, 3 Drawing Figures

METHOD AND APPARATUS FOR UNSCRAMBLING SYNC-SUPPRESSED TELEVISION SIGNALS

CROSS-REFERENCE TO RELATED PATENT APPLICATION

This application is related to copending application Ser. No. 610,560, filed May 16, 1984 entitled "Nonlinear Sync Processing Circuit" in the names of Frederick Auld and David L. Walker and assigned to Zenith Electronics Corporation, which application is hereby incorporated by reference.

BACKGROUND OF THE INVENTION AND PRIOR ART

This invention relates generally to television signal unscrambling systems and, specifically, to systems for unscrambling television signals that have their sync signals suppressed.

As mentioned in the copending application, it is well known in both over-the-air and cable television transmissions to encode or scramble the signals to prevent unauthorized use by those not having the requisite decoding equipment. Commonly, scrambling includes suppressing sync signals so that conventional television receiver synchronizing signal circuits are incapable of recovering them. In most instances a pilot signal or other reference is also transmitted to enable the decoding equipment to appropriately reconstruct the synchronizing signal and to key in the proper decoding signals. The invention in the copending application enables regeneration of proper sync signal information from the video information alone, that is without requiring a supplemental pilot or reference signal. As further explained therein, the regenerated sync signals include a field identifier. Some scrambling systems have different timing in the different fields and need to be identified as to field to properly and automatically control the decoding signal generating equipment. It will be appreciated that the decoding signals are in the nature of timing signals and the timing signal generating means often referred to herein and in the claims is interchangeable with decoding signal means.

OBJECTS OF THE INVENTION

The principal object of this invention is to provide a novel descrambling system for television signals.

Another object of this invention is to provide a method and apparatus for developing decoding signals for scrambled television signals in response to reconstituted sync signals.

A further object of this invention is to provide a method and apparatus for processing suppressed sync signals and, based thereon, for generating appropriate decoding signals for scrambled television signals.

SUMMARY OF THE INVENTION

In accordance with the invention there is provided a source of composite sync signal with field identification, sync detector means for producing output signals corresponding to the different fields and means for generating timing signals for producing decoding information during each field, the timing signal generating means being responsive to operation of the sync signal detector means.

The method of the invention is performed by deriving a sync signal with field identification and detecting the sync signals to produce outputs corresponding to the different fields for controlling means for generating timing signals and producing decoding information in each field in response to the timing signals.

BRIEF DESCRIPTION OF THE DRAWINGS

Other objects and advantages of the invention will be apparent upon reading the following description in conjunction with the drawings in which.

DESCRIPTION OF THE PREFERRED EMBODIMENT

As should be apparent, the system of the invention is suitable for supplying proper timing or decoding signals for a number of decoding systems presently used to scramble television signals. The sync signal regenerating circuit is independent of pilot signals or the like and relies only upon video information. The individual fields of the signal are identifiable in the regenerated sync and thus the vertical blanking pulses may be used to initiate, for each field, operation of suitable timing signal generating means to generate appropriate decoding signals to descramble the scrambled television signal. As will be seen, the individual decoding signal may be stored in a PROM programmed for the particular scrambling system employed. If more than one scrambling system is involved, individual PROMs may be substituted. In each case the regenerated sync is used to enable the PROM and the decoding signal is controlled by the field. It will be appreciated that the technology is adaptable for use in an encoder at the cable head end as well as in each individual subscriber decoder.

Figure 1:
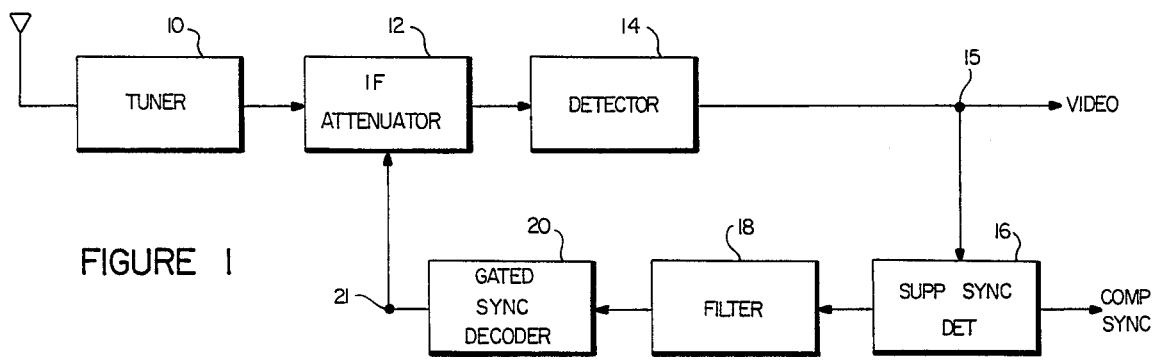
FIG. 1 is a partial block diagram of a television receiver incorporating the invention.

Referring to FIG. 1, a television signal tuner 10 is coupled to an antenna or to a cable and conventionally operates to produce an intermediate frequency (IF) signal that is supplied to an IF/attenuator 12 which, in turn, is coupled to a detector 14, the output of which supplies a terminal 15 at which conventional video information is available. Terminal 15, in accordance with the invention, is also coupled to a suppressed sync signal detector 16 which has one output labelled "Composite Sync" and another output which is connected to a filter 18. Filter 18 is a low pass type and essentially only passes the low frequency vertical sync to a gated sync decoder 20. The output of the gated sync decoder is supplied to a terminal 21, which is connected to IF-/attenuator 12. The output signal from gated sync decoder 20 is a decoding signal which is in time or synchronism with the input to IF/attenuator 12 for unscrambling the video in the scrambled television signal. The circuitry included in suppressed sync detector 16 is fully disclosed and described in the copending application.

Figure 2:
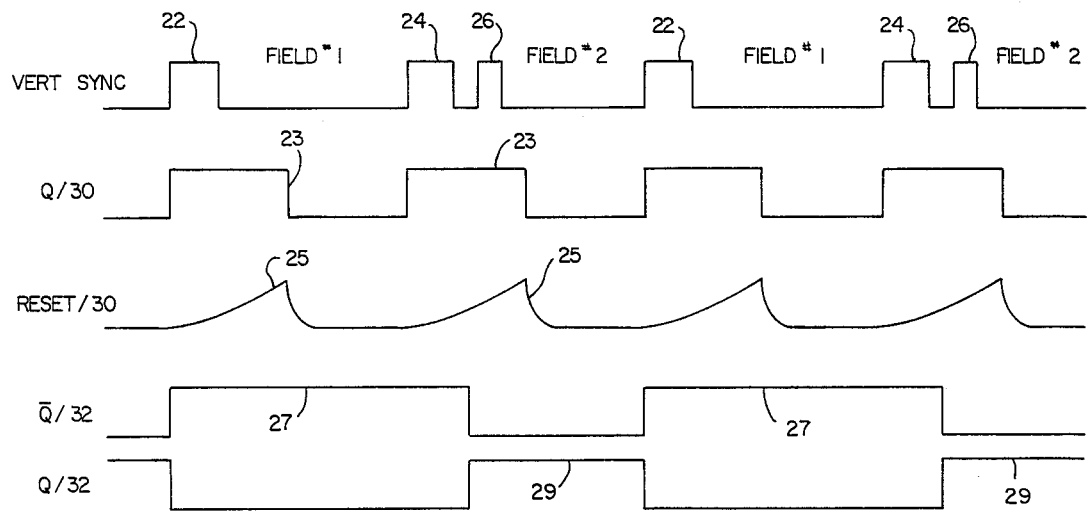
FIG. 2 is a series of waveforms illustrating operation of the invention.
Figure 3:
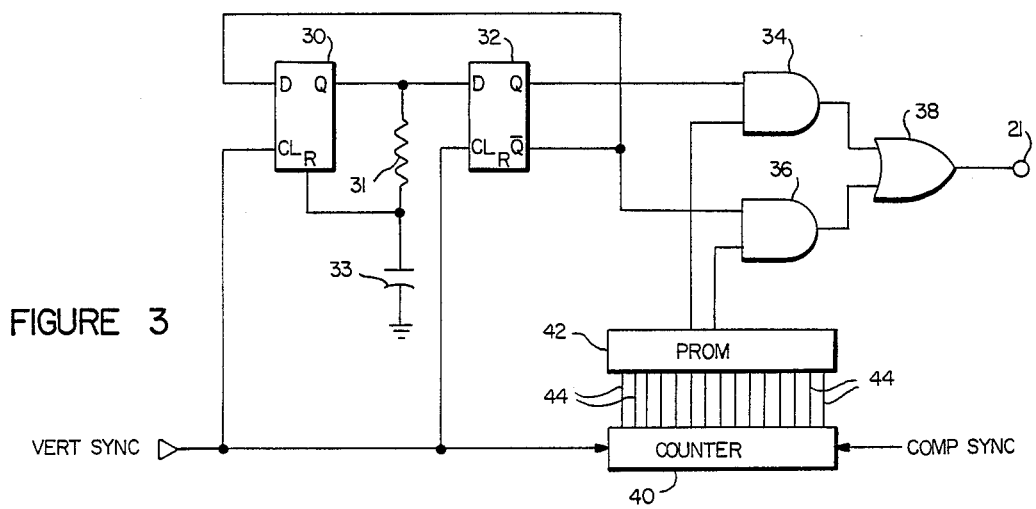
FIG. 3 is a partial logic diagram illustrating the functioning of the invention.

Reference to FIG. 2 in conjunction with FIG. 3 should now be made. In FIG. 2 the vertical sync waveform is a combination of signals identified in the copending application as the sync signals for the different fields with the horizontal sync information removed by low pass filter 18, thus leaving only the vertical blanking pulses. For field No. 1, a vertical blanking pulse 22 is developed whereas for field No. 2 a vertical blanking pulse 24 (of slightly shorter duration than blanking pulse 22) is followed by a short duration pulse 26. Pulse 26 thus serves as an identifier of the particular field, in this case field No. 2. The trailing edges of both vertical blanking pulses 22 and 24 occur at approximately horizontal line No. 6 and the trailing edges of pulses 26 occur at horizontal line No. 10 in the vertical blanking interval.

Q/30 illustrates the output at the Q terminal of a flipflop (FF) 30 and is shown as a series of pulses 23 having leading edges corresponding to the leading edges of the vertical blanking pulses 22 and 24. Reset/30 is a series of ramp or sawtooth waveforms 25 which peak at the trailing edges of pulses 23 and decay as illustrated. $\overline{Q}$/32 is a pulse that is developed at the leading edge of pulse 26 and persists to the subsequent leading edge of vertical pulse 22. Q/32 is the inverse of $\overline{Q}$/32 and is a pulse that is developed at the leading edge of pulse 22 and persists until the subsequent leading edge of pulse 26.

FFs 30 and 32 are interconnected as shown to provide for clocking of FF 32 under controlled conditions. Specifically, the D input of FF 30 is coupled to the $\overline{Q}$ output of FF 32. The Q output of FF 30 is coupled to the D input of FF 32 and to a delay network consisting of a resistor 31 connected in series with a capacitor 33 to ground. The reset terminal of FF 30 is connected to the junction of resistor 31 and capacitor 33. The clock inputs of both FFs 30 and 32 are connected to receive the vertical sync signal illustrated in FIG. 2. This signal is also supplied as the reset of a counter 40, the clock input of which is supplied with composite sync from suppressed sync detector 16. The Q and the $\overline{Q}$ outputs of FF 32 are respectively connected to one input of a pair of two-input AND gates 34 and 36, the other inputs of which are supplied from a PROM 42, which is coupled by a plurality of leads 44 to counter 40. The outputs of AND gates 34 and 36 are connected to an OR gate 38, the output of which is connected to output terminal 21 which, it will be recalled, is connected to IF/attenuator 12. The AND gates and the OR gate comprise a matrix circuit for controlling translation of the decoding signals from the PROM as a function of vertical field.

Initially all $\overline{Q}$ terminals are at a high logic level and all Q terminals are at a low logic level. When a vertical pulse 22 is supplied to the CL inputs of FFs 30 and 32, FF 30 is clocked and its Q terminal goes high as illustrated by Q/30 in FIG. 2. The delay network capacitor 33 begins to charge through resistor 31 as illustrated by the Reset/30 waveform. When the sawtooth waveform reaches its peak, a reset signal is supplied to the R terminal of FF 30 to reset FF 30 and to return its Q terminal to a low logic level. This point corresponds to the trailing edge of pulse 23 and illustrates operation with a single vertical pulse in field No. 1.

During field No. 2, a different result obtains. Vertical pulse 24 operates identically to vertical pulse 22 to produce a positive output at the Q terminal of FF 30, as illustrated. However, before waveform 25 peaks, a second pulse 26 is received at the CL inputs of the FFs. At this time, the D input of FF 32 is high when CL is clocked and FF 32 changes state. Its $\overline{Q}$ terminal goes low and its Q terminal goes high as illustrated by pulses 27 and 29 in $\overline{Q}$/32 and Q/32, respectively.

Meanwhile, counter 40 is counting horizontal pulses in the composite sync to determine the beginning of the vertical blanking interval in the television signal and the horizontal line numbers, all in a manner well known in the art. This information is communicated to the PROM 42 over leads 44. The vertical sync pulses are used to identify the different fields, namely fields 1 and 2, in the television signal and well known means in PROM 42 respond to produce, in serial fashion, decoding information corresponding to the particular field when appropriate horizontal line counts are reached by counter 40. While most sync suppression in scrambled signals begins on horizontal line 20 and ends around horizontal line 260 or 261, other timing arrangements can readily be envisioned and accommodated in PROM 42. PROM 42 is arranged to respond to field 1 and 2 signals to produce the appropriate decoding signals when initiated by the appropriate line numbers as determined by counter 40. While in some scrambling systems, the decoding information and timing is the same in each field, there are others where that is not the case and the fields must be identified.

Q/32 and $\overline{Q}$/32 are supplied to ANDs 34 and 36 along with the decoding information generated by PROM 42 (as a function of horizontal line timing) and thus the field outputs determine which decoding information is translated through OR 38 to the IF/attenuator 12 for descrambling. As mentioned, if the timing signals generated by the PROM are the same for both fields, the field identifier circuitry is of no consequence. In systems where the decoding signals are different in each field, however, the field identifier circuitry is required.

It should be apparent that each PROM is individually programmed for producing timing or decoding signals for a particular system of scrambling. Other PROMs may be conveniently plugged in since all of the information for their operation is known, i.e. the field is identified and the horizontal line numbers are counted so that appropriate decoding information, commencing and ending on an appropriate horizontal line in the vertical blanking interval, may be regenerated.

It will be appreciated that numerous modifications and changes in the described embodiment of the invention will be apparent to those skilled in the art without departing from the true spirit and scope thereof. The invention is to be limited only as defined in the claims.

What is claimed is:

1. In combination:
   a television signal source of vertical sync signal including a field identifier in one of the fields;
   sync signal detection means for producing different output signals corresponding to each field; and
   timing signal generating means for generating timing signals for each field;
   said timing signal generating means being coupled to said sync signal detection means and responsive to said output signals.

2. The combination of claim 1 wherein said timing signal generating means includes means for generating decoding signals during corresponding fields.

3. The combination of claim 2 further including counter means for identifying horizontal lines in the vertical blanking interval of said television signal; and
   means coupling said counter means to said timing signal generating means for controlling operation thereof in accordance with the horizontal lines.

4. The combination of claim 3, further including memory means for storing information for producing said decoding signal and wherein said counter means enables said memory means; and logic means for matrixing the output of said memory means with said output signals from said sync signal detection means.

5. In combination:

a television signal source of vertical sync signal including a field indentifier pulse in only one of the two fields;

detection means detecting said field indentifier pulse and producing two different output signals, one signal corresponding to the field with said field identifier pulse and the other signal corresponding to the field without said field identifier pulse;

counter means for determining the television signal vertical blanking interval and the horizontal lines therein;

memory means, for storing decoding signal information, coupled to said counter means; and matrix means coupled to said memory means and responsive to said two different output signals corresponding, respectively, to each of said two fields for developing a decoding signal for each of said fields.

6. The combination of claim 5 further including a flipflop in said detection means and wherein said matrix means comprise a pair of AND gates coupled to an OR gate, each AND gate having one input connected to said memory means and another input connected respectively to the outputs of said flipflop.

* * * * *